(12) United States Patent
Brenner

(10) Patent No.: US 7,696,925 B2
(45) Date of Patent: Apr. 13, 2010

(54) MEMORY REDUCTION IN GNSS RECEIVER

(75) Inventor: Joel Brenner, Arzo (CH)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 11/902,305

(22) Filed: Sep. 20, 2007

(65) Prior Publication Data
US 2008/0246659 A1 Oct. 9, 2008

(30) Foreign Application Priority Data
Sep. 21, 2006 (EP) ................... 06121054

(51) Int. Cl.
G01S 1/00 (2006.01)
(52) U.S. Cl. ............... 342/357.12; 342/357.05
(58) Field of Classification Search ............ 342/357.12, 342/357.13, 357.15
See application file for complete search history.

(56) References Cited

U.S. PATENT DOCUMENTS

| 6,934,322 B2 | 8/2005 | King et al. | |
| 7,471,747 B2 | 12/2008 | Heo | |
| 2003/0147457 A1* | 8/2003 | King et al. | 375/148 |
| 2005/0010362 A1 | 1/2005 | Dong-Sik | |
| 2005/0232380 A1* | 10/2005 | Valio et al. | 375/343 |
| 2008/0232514 A1* | 9/2008 | Huang | 375/343 |

FOREIGN PATENT DOCUMENTS

| EP | 0 701 333 B1 | 3/1996 |
| EP | 1 198 068 A1 | 4/2002 |
| WO | WO 98/02759 A1 | 1/1998 |
| WO | WO 2004/070413 A2 | 8/2004 |
| WO | WO 2005/003807 A1 | 1/2005 |

OTHER PUBLICATIONS

European Search Report and European Search Opinion—EP06121054, Search Authority—Munich Patent Office, Oct. 19, 2007.

* cited by examiner

Primary Examiner—Thomas H Tarcza
Assistant Examiner—Fred H Mull
(74) Attorney, Agent, or Firm—Shyam K Parekh

(57) ABSTRACT

Radiolocalization receiver with a massively parallel array of correlators, comprising a data compression module (199) to compress the incoherent integration values accumulated into the incoherent integration memories (176). By compressing incoherent integration values, relevant memory saving can be obtained or, in alternative, loss of data by excessive prescaling can be avoided or attenuated. The invention proposes a simple compression scheme based on offset subtraction which allows save memory size.

17 Claims, 4 Drawing Sheets

_US 7,696,925 B2_

MEMORY REDUCTION IN GNSS RECEIVER

REFERENCE DATA

This patent application claims priority from European patent application EP06121054, filed on Sep. 21, 2006, the contents whereof are incorporated by reference.

FIELD OF THE INVENTION

The present invention concerns a method of memory reducer in a GNSS receiver unit, like for example a GPS, GLONASS or Galileo receiver, as well as the corresponding receiver implementing such method. The present invention is particularly suitable to small-size portable units with highly parallelized architectures, in which hardware resources are particularly valuable. It can be usefully employed, however, in most GNSS receiver.

DESCRIPTION OF RELATED ART

Satellite radiolocalization systems, such as GNSS (Global Navigation Satellite System), GPS (Global Positioning System), GLONASS (GLobal Orbiting Navigation Satellite System) or Galileo (European global satellite navigation system) rely on the reception of radio signals broadcast from a number of orbiting satellites and use the information contained in these signals to determine the distances, or ranges, from the receiver to each of the received satellites. The orbits of the satellites being known, absolute time and the location of the GPS receiver can then be determined geometrically.

In the context of the present invention the terms "receiver" and "GPS receiver" can designate a complete self-contained receiver device, but also a module, included in a complex entity, for example a GPS module in a cellular phone, a car alarm, a PDA (Portable Digital Assistant) and so forth. The terms above may also indicate a pluggable module, which may be connected with a hosting device by means of an appropriate bus, for example a GPS PC-card to be connected to a portable computer, or a GPS card connectable to a PDA or to a portable phone via an appropriate interface like a memory card interface, a USB interface, or a wireless communication interface.

The terms "receiver" and "GPS receiver" should also be understood, in the context of the present invention, as including one of more integrated circuits, arranged to realize a complete GPS receiver or a complete GPS module, as defined above.

The following description relates mostly to the GPS Global Positioning System. The invention is not however limited to this particular system but can also be employed in receivers for radiolocalization systems based on the same principles, for example the GLONASS system or the GALILEO system.

The general functioning of a satellite radiolocalization devices are well known and will be resumed briefly in the description. Reference is also made to patent applications EP 1198068 and WO05003807 in the name of the applicant, which are hereby incorporated by reference.

In the case of GPS radiolocalization system, each of the operational GPS satellites, also indicated as Space Vehicle or SV, transmits a microwave radio signal composed of two carrier frequencies, referenced as "L1" and "L2" frequencies and situated at 1572.42 MHz and 1227.60 MHz respectively. The L1 and L2 carriers are modulated by two digital ranging code sequences, called the C/A (coarse acquisition) code and the P code, the latter being mostly restricted to the US government and military.

The C/A code, which is used by commercial GPS receiver, is modulated in the L1 and in the L2 frequency. The C/A codes, which are unique for each GPS satellite, are pseudo-random Gold codes comprising a repetition of a 1023 bits, or "chips", with a transition rate of 1.023 MHz. The C/A code thus repeats itself every millisecond. The ranging code sequences are synchronized to a common precise time reference, the "GPS time" which is held by precise clocks on board of each satellite, and which are synchronized to a master clock. The C/A codes are pseudo-random noise sequence, and are often indicated in short as PRN. The effect of the PSK modulation with the C/A code is to spread the spectrum of the modulated signal over a 1 MHz bandwidth.

Other radiolocalization systems, for example the proposed Galileo system, also employ similar or equivalent signal structures, based on ranging codes synchronized to a common standard of absolute time. The term "GPS time" is used in the following to designate both the absolute time standard of the GPS system and the time standard of other radiolocalization satellite systems, when the invention is applied to such systems.

Both L1 and L2 carriers further carry a 50 bps navigation message, the NAV code. The navigation message contains, along with other information, the coordinates of the GPS satellites as a function of time, clock corrections, and atmospheric data. The NAV message is encoded by inverting the logical value of the C/A code whenever the NAV bit is "1", and leaving it unaltered otherwise. As it will be seen later, the presence of the NAV code limits the time coherence of the C/A code and thus complicates signal acquisition.

The signal level of the GPS signals is, nominally, −130 dBmW, a value which is further attenuated whenever the view of the sky is obstructed, and especially within buildings. Other satellite navigation systems provide signals of comparable strength. Such levels are well below the thermal noise floor, thus the signal can be received only by use of statistical techniques.

In order to acquire these codes and perform a position fix a GPS receiver generates, for each received satellite, a local replica of the C/A code, the PN code, adjusted to a local NCO running at a frequency close to 1.023 MHz. The code is then time-shifted, correlated with the received signal in a correlation engine of the receiver, and integrated, for a time that can be more or less long according to the noise level, until a peak of correlation value is obtained for a certain value of time-shift, that depends from the distance between the receiver and the satellite.

The amount of time-shift needed to achieve optimal correlation, or pseudo-range, is an indication of the distance between the satellite and the GPS receiver. The internal clock of the GPS is usually affected by a large error with respect to the GPS satellite clocks. In order to resolve this error a GPS receiver must acquire at least four satellites to provide a position fix comprising the three space coordinates x, y, z and the time t.

The carrier frequencies of GPS signals are, in addition, shifted from the nominal frequency by an unknown Doppler shift. The acquisition of GPS signals is an inherently time consuming process which involves searching for a correlation peak in a three-dimensional parameter space, whose axes correspond to the satellite identity; frequency and temporal shift of the pseudo-random Gold code. For each search, aimed at a specific satellite, all possible code phases plus all possible frequencies may have to be tried in the correlation circuit until a peak is found. The search process may be shortened if the receiver has some knowledge of its location and of the current positions and speeds of the transmitting satellites. In the worst case, however, the search time can extend to several seconds.

The phase in which the GPS receiver endeavors to localize a sufficient number of satellite signals in the phase offset—Doppler shift space with little or no knowledge of their position is usually named the "acquisition" phase. Once the peaks are found, on the other hand, in the "tracking" phase, the system has only to follow their drift, which is usually done with less difficulty or delay.

Especially in low-signal situation, like for example in buildings, the weakness of the signal imposes longer integration times, in order to determine the presence of a peak. The presence of the navigation message limits the coherent integration time to a maximum of twenty milliseconds, in GPS receivers. Incoherent integrations lasting several seconds are not uncommon.

In order to overcome such difficulties, some receivers adopt a brute force technique aptly named "massive correlation". Depending on the number of correlators, acceptable acquisition times can sometimes be achieved even under low signal power conditions. The term "tap" is generally used to mean the physical circuit element that can perform a single correlation operation between the incoming signal and the replica code with a certain frequency and code offset.

As an example of massive correlation, a "hot start" with a GPS receiver may be considered, wherein the receiver has an approximate knowledge of its location and the present time or where a rough estimate of time is available through assistance data. Under such conditions, the search space can be equal to the full PN code space (1023 chips for GPS C/A code) and some hundreds of hertz (Hz) in the frequency domain (for example, +/−150 Hz. The search range of a single tap might be, for example, ½ chip in the code space and +/−1/(3 T) in the frequency space (where T is the coherent integration time and 2/(3 T) is called frequency bin). Thus, to cover the entire search space a set of around 16 thousands taps is needed.

Many GPS receivers implement even higher numbers of taps and can search more than one satellite in parallel. Other receivers use fewer taps, but must serialize the search of the single satellite into several steps. A "massive correlator" receiver is normally used to mean a receiver that has at least the potential to search for the whole code uncertainty (i.e. at least 2046 physical taps) in parallel for one satellite. The search in the frequency domain can be performed using post correlation Fast Fourier Transform (FFT), which is more efficient, as several Doppler shifts can be searched in parallel, or using physical taps, which is quite inefficient especially for high frequency uncertainties.

The "massive correlation" approach relies on the integration of a large number of correlation taps in parallel and for a suitable time. Since each integrated result must be stored in a separate memory position, the implementation of massive correlation receiver need more and more memory as the number of taps acquired in parallel is increased, and this increases the cost of the receiver. If the acquisition processor is realized, as it is common, in a single ASIC, the silicon area taken up by the memory reduces the computing power that can be obtained by a chip of a given area and technology, and poses several difficult engineering problems. Lastly, the large memory bank required by massive correlation receivers is a source of power consumption by itself.

It is known to alleviate these problems by applying a scale factor to the data before they are stored in the memory. In this way the accumulated values are smaller and can be accommodated in cells with a reduced number of bits. Such downscaling, however, implies a loss of information and must be used carefully to avoid loss of performance of the acquisition.

There is therefore a need for a GNSS processor using a method of massive parallel correlation which is less memory demanding than the known methods, and that loses less information than the known methods.

BRIEF SUMMARY OF THE INVENTION

A radiolocalization receiver includes a massively parallel array of correlators, comprising a data compression module to compress the incoherent integration values accumulated into the incoherent integration memories. By compressing incoherent integration values, relevant memory saving can be obtained or, in alternative, loss of data by excessive prescaling can be avoided or attenuated. A simple compression scheme is based on offset subtraction, which allows reduced memory size.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
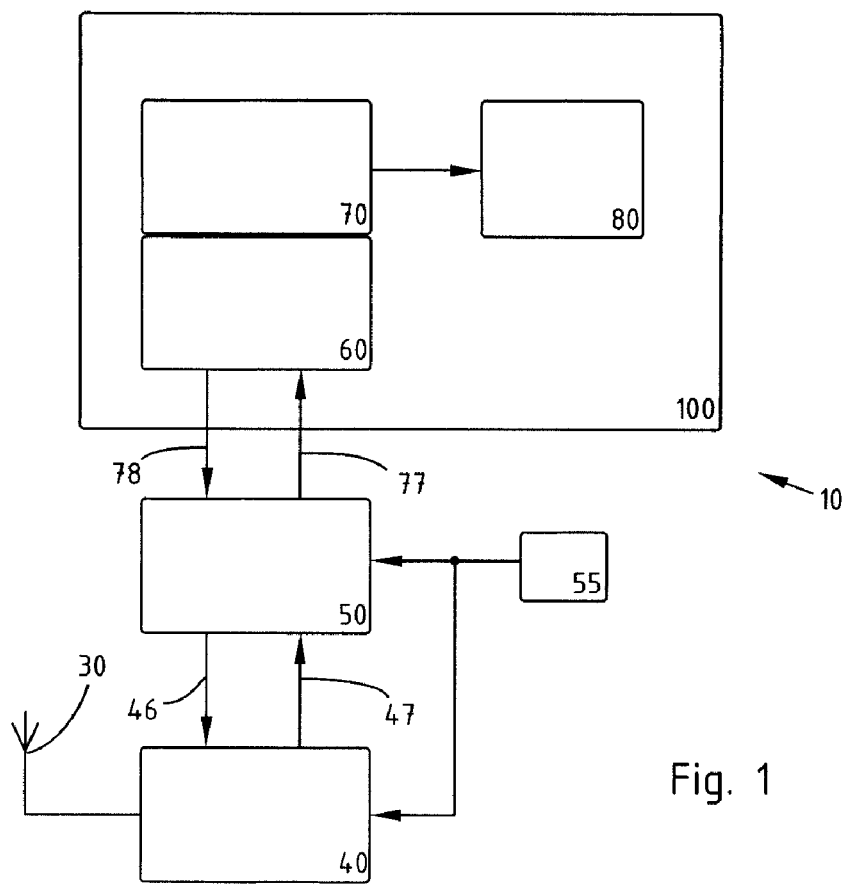
FIG. 1 reproduces, in schematic form, the architecture of a GNSS receiver suitable for the implementation of the invention.

FIG. 1 represents schematically the layout of a generic GNSS device 10 comprising one or more antennas 30 which allow coupling with radio signals radiated from different GNSS satellites.

According to FIG. 1, the radiolocalization device 10 of the present invention comprises a RF-receiver or radiofrequency module 40, whose function is to process the signals received from the radiolocalization satellites by the antenna 30. The radiofrequency circuit comprises a single- or multiple-conversion heterodyne radio receiver and provides at his output 47 a navigation signal of low frequency, like a baseband signal, analogue or digital, or a low-IF signal, for example a low-IF signal at 4.092 MHz.

According to the modulation scheme of the received satellite constellation, the output 47 will comprise several angular component of the signal. In the case of GPS, for example, two components shifted by 90° are needed, and are conventionally referred to as the I (In-phase) and Q (Quadrature) component. Other modulation schemes, for example the modulation proposed for the GALILEO system, call for more than two angular components.

The RF module 40 is connected to a main time base generator 55, which provides a stable time base reference for the radiolocalization device 10, for example a 32.734 MHz time base. Since time base generator 55 must be considerably precise and stable to allow acquisition and tracking of the GPS signal, it comprises generally a high-quality temperature compensated crystal oscillator or TCXO.

The output 47 of the RF module 40 is fed to a signal processor 50, also called pseudo-range engine 50 which, in turn, provides control instructions 46 to the RF circuit 40. The function of the pseudo-range engine 50 is to de-spread the signals received from the satellites, by generating, for each received satellite, a local replica of the modulation code (the C/A code in the case of a commercial GPS receiver) which is precisely time-aligned with the received signal. The code shifts, or pseudo-ranges 77, generated by the pseudo-range engine 50 are transmitted to the navigation engine 60, which calculates a fix for position and time coordinates x, y, z, t. The navigation engine also steers the pseudo-range engine 50 by appropriate search instructions 78. The positional fix is for example obtained by Kalman filters, or by other known filters, and the navigation engine may need to follow the pseudo-range data 77 along several code periods until a satisfactory solution is found.

Preferably the pseudo-range engine 50 and the RF module 40 are realized as two separate integrated circuits or as a single common integrated circuit.

In the illustrated variant of the invention the navigation engine 60 is part of a host system 100, which also comprises application navigation software 70 and appropriate peripherals 80 for interaction with a user. The radiolocalization device 10 of the invention is, in this case, an extension of the host system, for example in the form of an extension card or module for a cellular phone, a PDA, a game console, a personal computer or any other suitable host device. The invention comprises however also standalone apparatuses which incorporate navigation engine, application software and peripherals together with the RF module and pseudo-range engine. In this case the functions of the navigation engine 60 and of the pseudo-range engine 50 could conveniently be grouped in a single-chip device.

In the case of a multi-standard GNSS radiolocalization device, the received satellites may belong to several satellite constellations, for example to the GPS, Galileo, or GLONASS constellations, and emit in several radio bands.

Preferred embodiments of the invention have circuitry elements or the software equivalents thereof for performing correlation. Such elements, when broken down into abstracted, individual units, may be referred to as "taps", with reference to a classical correlation architecture based on tapped shift registers. It must be kept in mind, however, that the present invention is not limited to this particular architecture, and that the term "tap" designates here an abstract correlation unit, arranged to produce a correlation value, and which may also be partially or totally realized in software.

Advantageously, the receiver of the invention includes a large number of correlation taps, which can be programmed in order to execute, in parallel, a plurality of integrations of signals having different PRN sequences, code shifts, and frequencies. Faster acquisition times may be obtained by judiciously programming and using the available taps in order to concentrate the search on those combination of PRN sequence, code shift and frequency, which are more likely to provide a useful signal, and avoiding to assign taps to regions of the search space which are less likely to succeed for example because of a cross-interference signal.

Figure 2:
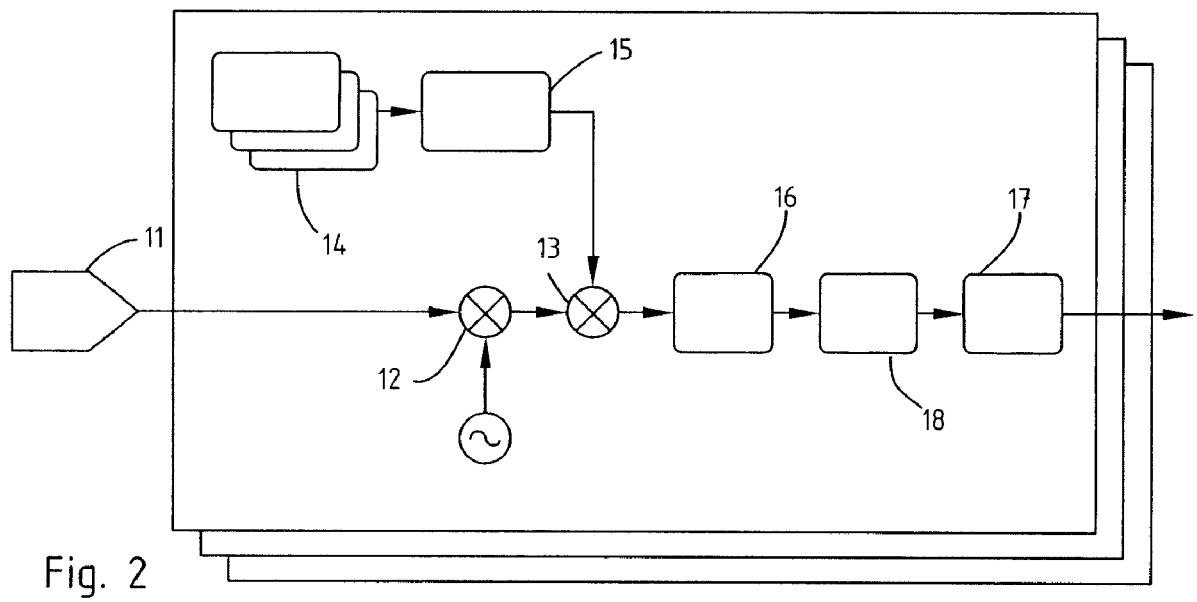
FIG. 2 presents a schematic diagram of a possible realization of single GPS tap.

FIG. 2 shows, by way of example, a possible example of a physical tap with a digital input 11, where digital samples of the received signal are present. If needed, the digital input 11 is supplied to a carrier suppression/shift circuit 12, comprising a mixer and a local oscillator, which removes an estimated or known carrier wave from the digital samples providing a baseband signal. Such carrier suppression circuits are typically shared by a number of different taps. The samples are then supplied to a signal despreader 13.

Despreader 13 has two inputs, one for the baseband signal, while another originates from a replica code generator 14. The code generator provides, by methods known in the art, a local replica of the known PRN code for the particular satellite being searched. The code generation may be serial (one code chip after another) or parallel (more than one code chip at one time), or a combination thereof, depending on the correlation method in use. Preferably one code generator will be shared by several taps dedicated to the search of the same satellite.

The local PRN code can be shifted by, for example, shifter 15. Since a single code replicator may be shared by many taps, it is necessary to phase-shift the code so that different taps can correlate the known PN code to different signal positions.

Despreader 13 effectively multiplies the known, phase-shifted PN code generated by code replicator 14 with the signal originating from carrier wipeoff circuit 12. This not only establishes a correlation between the local replica code and the code received at input 11, but also has the effect of de-spreading the signal, if the known PN code is correctly aligned with the signal in the tap of concern, and making it detectable above the noise level.

In a preferred variant, the baseband signal is transformed into its frequency representation by a FFT operation, multiplied with a corresponding frequency representation of the local PRN code, and converted back in the time domain by an inverse FFT operation. This allows a higher parallelization and is especially advantageous in a massively parallel architecture.

After despreading at despreader 13, the signal is input into coherent accumulator 16, which effectively integrates the received signal. The integration is coherent because the sign of the received signal is included in the integration. In a GPS environment, however, the NAV signal introduces a random sign change every twenty milliseconds and, therefore, coherent integration should not exceed this time, and is very often limited to sixteen milliseconds in order to In order to reduce the power loss due integrations across bit changes. In other radiolocalization systems the time of coherent integration is limited as well. Other reasons to limit coherent integration time are instability of local oscillators and the fact that longer the coherent integration times correspond to proportionally narrower frequency spans in the FFT domain.

The search for very low power signals requires long integration times, for example, 1 to 3 seconds, until a recognizable correlation peak appears. Such long accumulation times can not be obtained by coherent integration, for the reasons explained in the above passage. The result of the coherent integration over a particular time period is then repeatedly added to an incoherent accumulator 17, which sums the results without regard to sign, as an absolute value or square, for example.

For example incoherent accumulator 17 may be incremented every twenty milliseconds 100 times, thus realizing a two seconds incoherent integration. Incoherent integration is less effective than coherent integration in bringing the signal over the noise level.

As a result of noise however, several correlation peaks will be found, one peak corresponding, for example, to the searched signal, while the other derive from statistical noise fluctuations. GNSS receivers generally deal with this situation by performing incoherent integration for long periods of time, until a reasonably low number of candidate peaks appear, with reasonable statistical certainty, above the surrounding noise. The "true" signal peak emerges as the signal having the highest correlation value, for example.

As mentioned already the value of the coherent integration is optionally scaled down, by dividing unit 18, before it is added to the incoherent accumulator 17, by a scaling factor, whose value is chosen to avoid an overflow of the incoherent accumulator 17. By scaling down the coherent integration values, the incoherent register 7 takes up less space. Large scale factors, however, can not be used because of the data loss they introduce.

Figure 3:
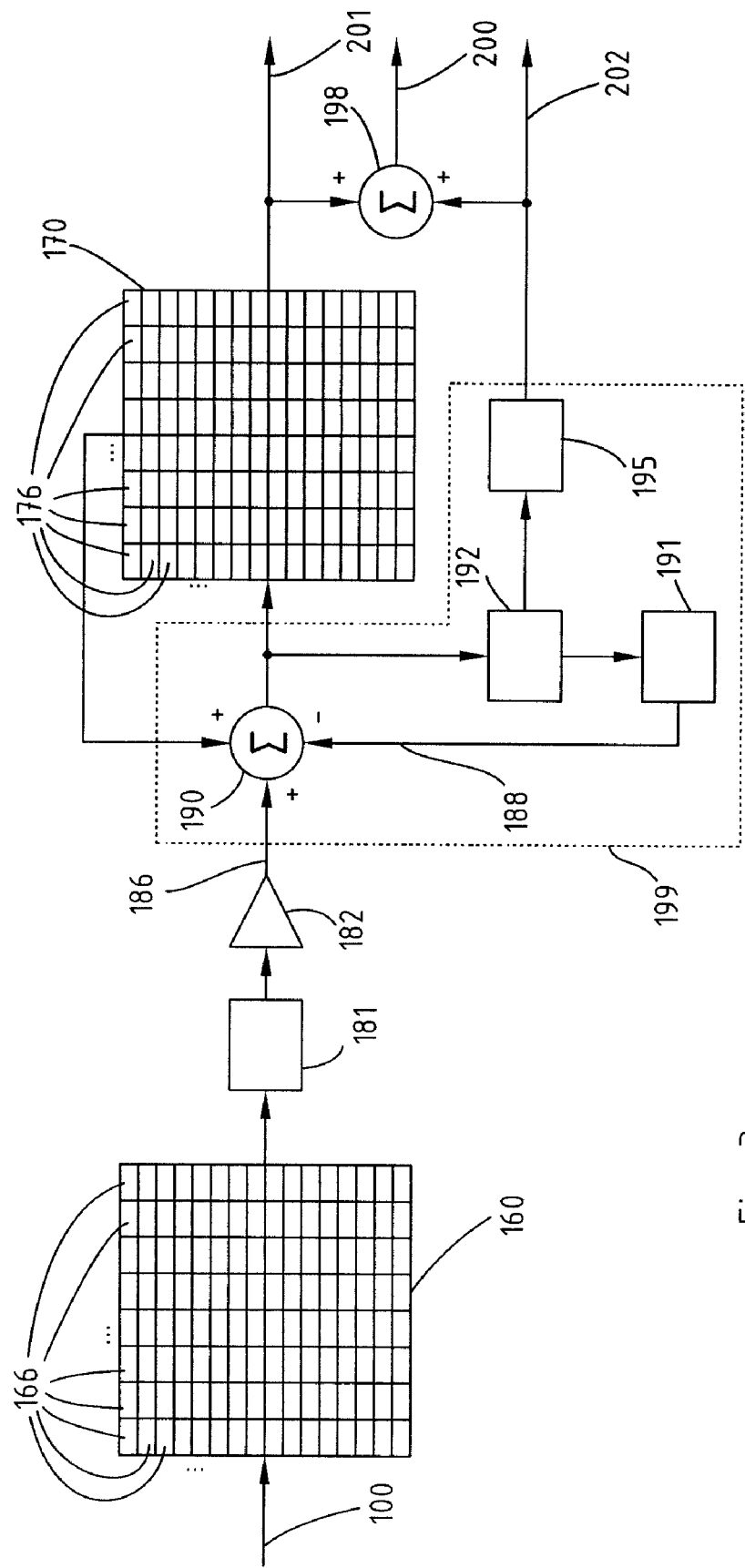
FIG. 3 shows, schematically, the incoherent integration system of a receiver according to the present invention.

FIG. 3 shows a possible realization of an incoherent accumulator in a GNSS receiver according to the present invention. Memory area 160 contains a plurality of memory registers 166 used to store the result of coherent integration for all the taps in a GNSS receiver. Coherent integration data are provided, through input 100, by one or more correlation units, not represented. Individual memory locations of memory area 160 correspond to acquisition taps, associated with defined values of PRN sequence, code shift and frequency. During acquisition registers of memory area 160 are updated periodically with new values of the coherently integrated correlations.

When the signals searched for are low, coherent integration is not sufficient to extract them from the noise. Coherent integration values are therefore accumulated, for example every twenty milliseconds, in the incoherent integration memory area 170, which is composed of a plurality of locations 176 similarly to memory area 160, until a peak of sufficient strength is obtained.

Coherent integration values are presented to magnitude module 181, which calculates their absolute value (or, equivalently, the square) and, optionally, to prescaler 182, to be divided by a predefined scaling factor and finally providing increment values 186 for the incoherent integration.

Increment values 186 are transferred to a compression encoding unit 199 that stores and updates the incoherent integration data into memory 170 in compressed form. Adder 190 increments each position in the incoherent integration memory 170 with the increment value 186 so obtained, minus a numerical offset 188, provided by current offset register 191.

While the incoherent integration data of memory area 170 are updated, offset setting module 192 calculates the offset to be used in the next increment step, on the base of the incoherent integration values stored in memory 170. In a preferred variant, the offset is taken as the minimum of the values stored in memory 170, but other choices are possible. The offset could be for example the average value, or the maximum, or a predetermined value, either constant or variable, during the incoherent integration, according to a predefined sequence. The choice of the minimum, however, is preferred because it allows using an unsigned integer format for the memory area 170.

An advantage of the disposition of FIG. 3 is that the data stored in memory area 170 do not grow linearly in magnitude with the progression of incoherent integration. Rather, by choosing suitable values for the current offset and the accumulated offset, the memory area 170 shall store only differential values, in the distribution of incoherently integrated values. Module 199 of FIG. 3 thus realizes a compression of incoherent integration data, because small values can be represented in a reduced number of bits.

At the end of one update cycle the offset setting module 192 updates the value of the current offset register 191 and adds the current offset to the global offset register 195, which will be used to decode the incoherent integration data, in uncompressed form.

According to a first preferred variant of the invention, the current offset register 191 is updated, by the offset setting module 192, with a value equal to the minimum value stored in memory area 170. This ensures optimal use of memory without data loss and without using signed arithmetic.

In an alternative variant, an average value of data stored in memory area 170 could be written in the current offset register. This value could be calculated in real time by offset setting module 192, or estimated approximately on the base of known factors like coherent integration time and noise level. In this case, however, the algorithm stores negative and positive values in memory 170, hence signed arithmetic is needed in adders 190 and 198.

If appropriate, the decoding can be done directly at the output, for example by adder 198, providing the uncompressed incoherent integration data at the output 200. Alternative optional outputs 201 and 202 provide direct access to the compressed incoherent integration data contained in memory 170 and global offset register 191.

Figure 4:
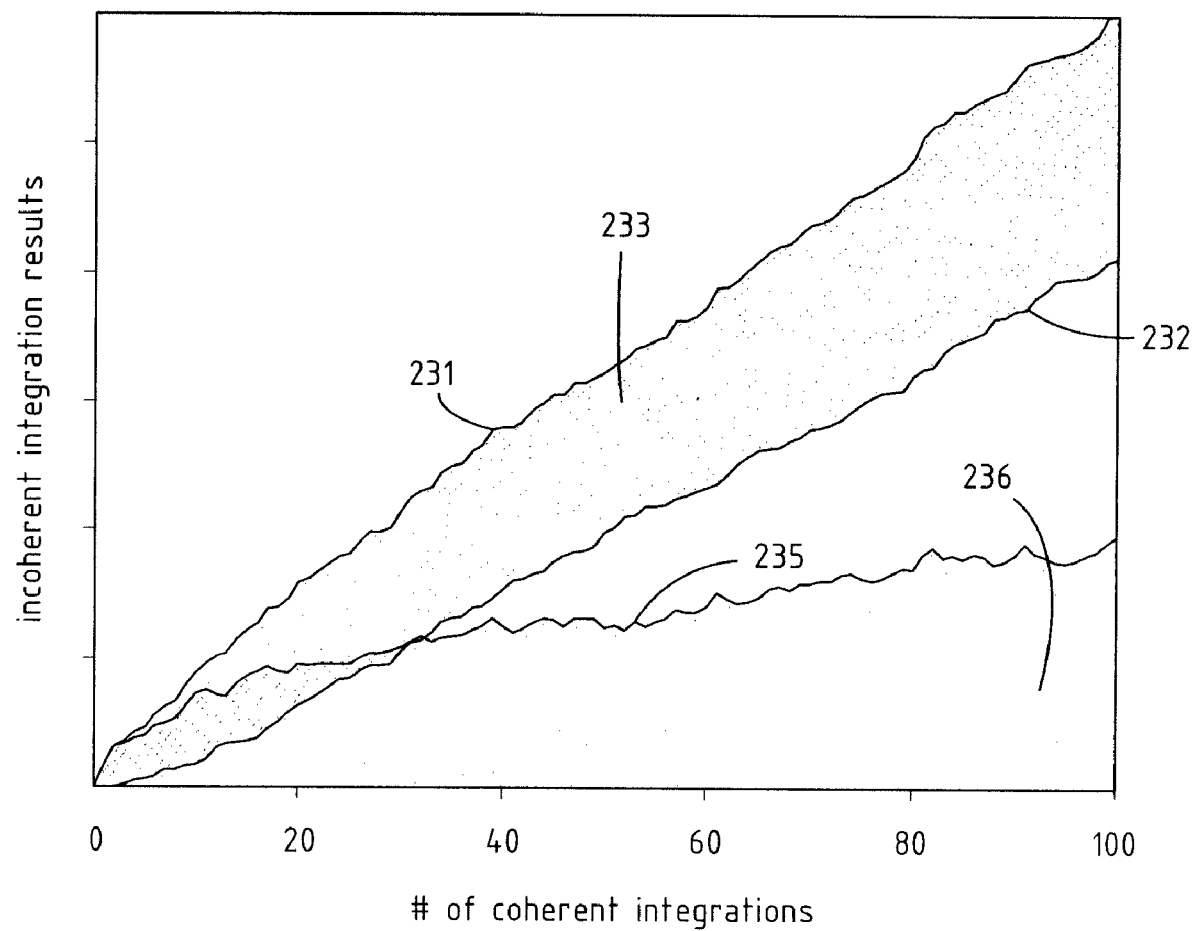
FIG. 4 illustrates, in a diagram, the progression of incoherent integration in a collection of correlation taps according to an aspect of the invention.

This is shown by diagram of FIG. 4 which relates to a simulated population of taps that are receiving pure noise, as a worst-case example. It has as abscissa the number of coherent integrations and as ordinates the integrated incoherent correlation values. Curve 231 represents the maximum value in the tap population and curve 232 the minimum one. The incoherent correlation values thus lie, as the incoherent integration progresses, in cross-shaded area between curves 231 and 232. The data actually stored in memory 170 according to data reduction algorithm of described above, in relation with FIG. 3, have much smaller values, and lie in the hatched 236 area limited by curve 235.

FIG. 4 shows that, after 100 coherent integrations, for example, the incoherent correlation values would reach a far higher value than the compressed values. According to the invention, the offsets are constantly updated in registers 191 and 195 so that the memory 170 needs only store small values in memory locations 176.

With respect to known solutions, the device of the invention requires a lower number of bits or, available memory size being equal, uses smaller scaling factors.

The data compression algorithm shown above has several desirable advantages, namely it is computationally very simple, easy to implement in hardware, and that the incoherent integration data can be incremented without decompressing them. Other data compression methods, for example run-length encoding, entropy encoding, or lossy compression methods may also be used within the frame of the present invention.

Figure 5:
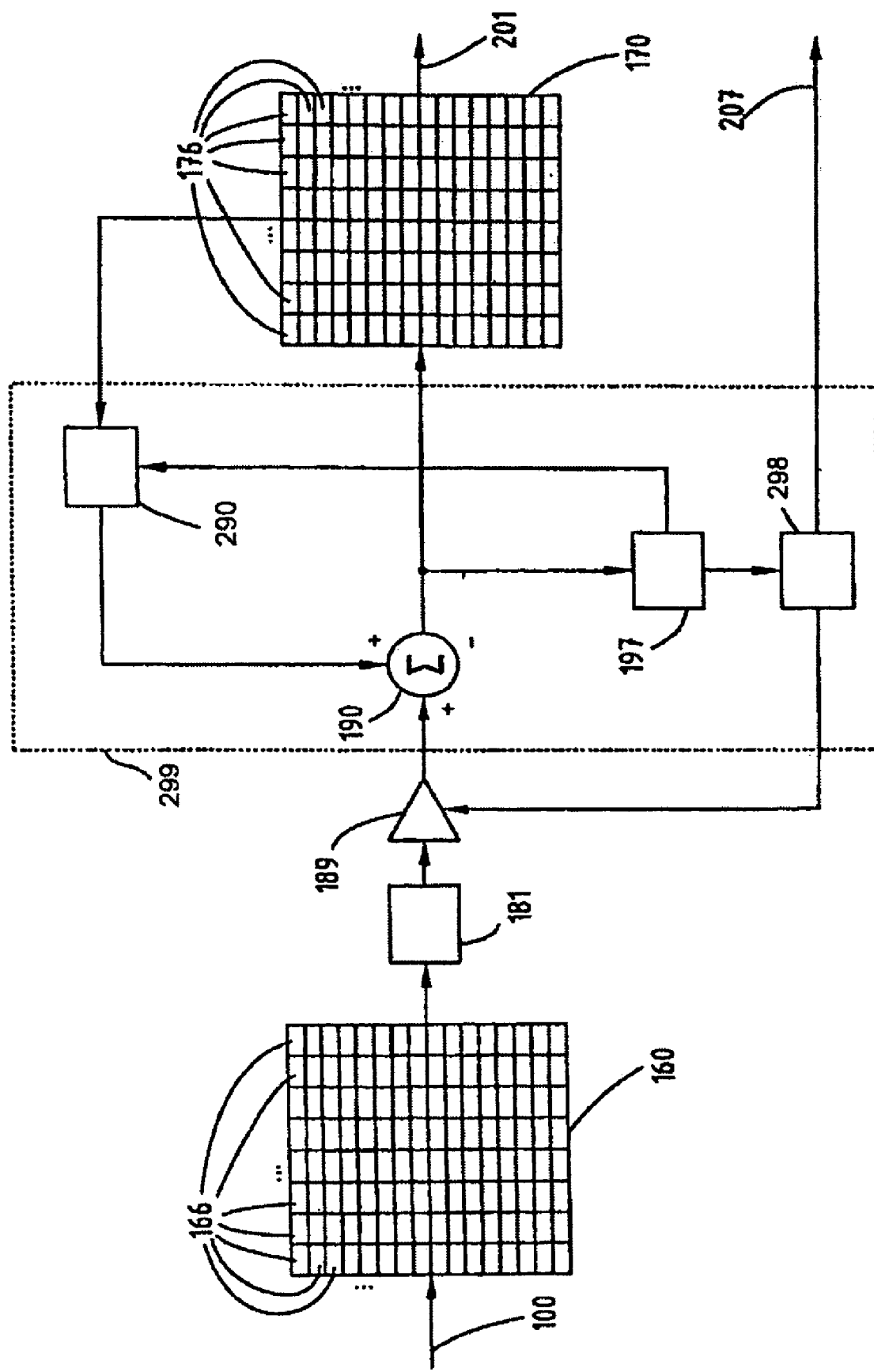
FIG. 5 presents a schematic diagram of a further embodiment of the present invention.

According to a further embodiment of the present invention, represented in FIG. 5, data compression is achieved, in lossy fashion, by dynamically adapting the scaling factor to the accumulated incoherent integration results. In the represented example the scaling ratio introduced by prescaler 189 is programmable by a dedicated register 298, which is also readable by the output 207. The compression encoding unit 299 comprises a maximum detector 197, which determines, at each incoherent integration cycle, the maximum content of the incoherent integration registers 176. If the maximum detected value is close to the maximum value that can be stored in the registers 176, the maximum detector 197 increases the scaling factor stored in the scaling factor register 298, for example by doubling it. The scaling factor register 298 is read by variable prescaler 189, so that all successively coming samples will be divided by the new scaling ratio. At every change of the scaling factor, incoherent correlation data already accumulated in registers 176 are scaled down by rescaler unit 290, to bring them to the same scale as the prescaler 189.

If, for example, the scaling factor in register 298 is increased by successive doublings, the rescaler unit 290 may be implemented as an arithmetic bit-shift operation, in which the data read from memories 176 are either left undisturbed (shifted by zero bits) in normal cycles, or divided by two (right-shifted by one bit) in accumulation cycles immediately following a doubling of the scaling factor.

According to this variant of the invention, the data compression involves a certain loss of information, as the least significant bits are discarded at each resealing. It however offers an optimal use of the available memory 170, both for long and short incoherent integration intervals.

The invention claimed is:

1. A radiolocalization receiver comprising:
    correlation means for processing a signal from a RF interface, operatively arranged for correlating the signal from the RF interface with a plurality of replica codes, each replica code having a determined code shift and a determined frequency,
    incoherent integration means, for accumulating a series of coherent integration values into a plurality of incoherent integration memory locations,
    characterized by
    data compression means for compressing the content of the incoherent integration memory locations based in part on incoherent integration values previously stored in the incoherent memory locations, comprising magnitude extraction means for extracting the absolute value or the square of the coherent integration values stored in coherent integration memory locations and to generate increment values to be accumulated into the incoherent integration memory locations, wherein the data compression means is configured to subtract a current offset value from the increment values of each coherent integration and to store an accumulated offset of all the offset values subtracted during an incoherent integration operation.

2. The radiolocalization receiver of claim 1, further comprising a RF receiver providing the RF interface for receiving one or more signals modulated with codes, coming from radiolocalization transmitters.

3. The radiolocalization receiver of claim 1, further comprising coherent integration means, for accumulating the output of the correlation means in a plurality of coherent integration memory locations, each coherent integration memory location corresponding to a determined replica code having a determined combination of code shift and frequency of the replica code.

4. The radiolocalization receiver of claim 1, further comprising prescaling means for dividing the increment values by a scaling factor, the data compression means being arranged to further compress the increment values divided by the scaling factor.

5. The radiolocalization receiver of claim 4, wherein the prescaling means are arranged to divide the increment values by a programmable scaling factor, the data compression means being arranged to dynamically adapt the programmable scaling factor according to the content of the incoherent integration memory locations.

6. The radiolocalization receiver of claim 5, further comprising a rescaler arranged to rescale the content of the incoherent integration memory locations at each change of the programmable scaling factor.

7. The radiolocalization receiver of claim 1, further comprising an adder that provides uncompressed incoherent integration data.

8. The radiolocalization receiver of claim 1, wherein the data compression means comprises an adder arranged to subtract a current offset value from the increment values, a current offset value register, arranged to store the current offset value and an accumulated offset register arranged to accumulate all the current offsets of an incoherent integration operation.

9. The radiolocalization receiver of claim 8, further comprising an offset setting module, arranged to compute the current offset value and to set the current offset register at the current offset value.

10. The radiolocalization receiver of claim 1, further comprising an offset setting module, arranged to compute the current offset value and to set the current offset register at the current offset value.

11. The radiolocalization receiver of claim 10, wherein the offset setting module is arranged to compute the current offset value as the minimum value stored in the incoherent integration memory locations.

12. Method of performing an incoherent integration of correlation data in a radiolocalization receiver, the receiver comprising:
    correlation means, processing a signal from a RF interface, operatively arranged for correlating the signal from the RF interface with a plurality of replica codes, each replica code having a determined code shift and a determined frequency,
    incoherent integration means, for accumulating a series of coherent integration values into a plurality of incoherent integration memory locations,
    the method comprising:
        accumulating, for a defined period of time, the output of the correlation means in a plurality of coherent integration memory locations,
        calculating a plurality of increments based on the absolute values of the content of the coherent integration memory locations,
        adding the increments to a plurality of incoherent integration memory locations,
    characterized by
        compressing the content of incoherent integration memory locations based in part on incoherent integration values previously stored in the incoherent memory locations, and extracting the absolute value or the square of the coherent integration values stored in coherent integration memory locations and generating increment values to be accumulated into the incoherent integration memory locations, wherein compressing further comprises subtracting a current offset value from the increment values of each coherent integration and storing an accumulated offset of all the offset values subtracted during an incoherent integration operation.

13. The method of claim 12, wherein said calculating the plurality of increments comprises dividing the increments by a scaling factor.

14. The method of claim 13, wherein the scaling factor is programmable, and wherein said dividing the increments by the scaling factor further comprises dynamically adapting the programmable scaling factor according to the content of the incoherent integration memory locations.

15. The method of claim 12, wherein the current offset is taken as the minimum of the incoherent integration memory locations.

16. The method of claim 12, further comprising repeating the accumulating, calculating, adding and compressing elements of the method until a statistically significant correlation peak is found in the incoherent integration memory locations.

17. A radiolocalization receiver comprising:
- a correlator configured to process an RF signal from a RF interface to correlate the RF signal with a plurality of replica codes each having a determined code shift and a determined frequency;
- an incoherent integrator configured to accumulate a series of coherent integration values and store these values in a plurality of incoherent integration memory locations; and
- a data compressor configured to compress the content of the incoherent integration memory locations based in part on incoherent integration values previously stored in the incoherent memory locations;
- wherein the data compressor is configured to compress the content by determining an absolute value of the stored coherent integration values or by determining a square of the stored coherent integration values, and generating increment values to be accumulated into the incoherent integration memory locations; and
- wherein the data compressor is configured to subtract a current offset value from the increment value of each coherent integration and to store an accumulated offset of all the offset values subtracted during an incoherent integration operation.

* * * * *